Figure 1:
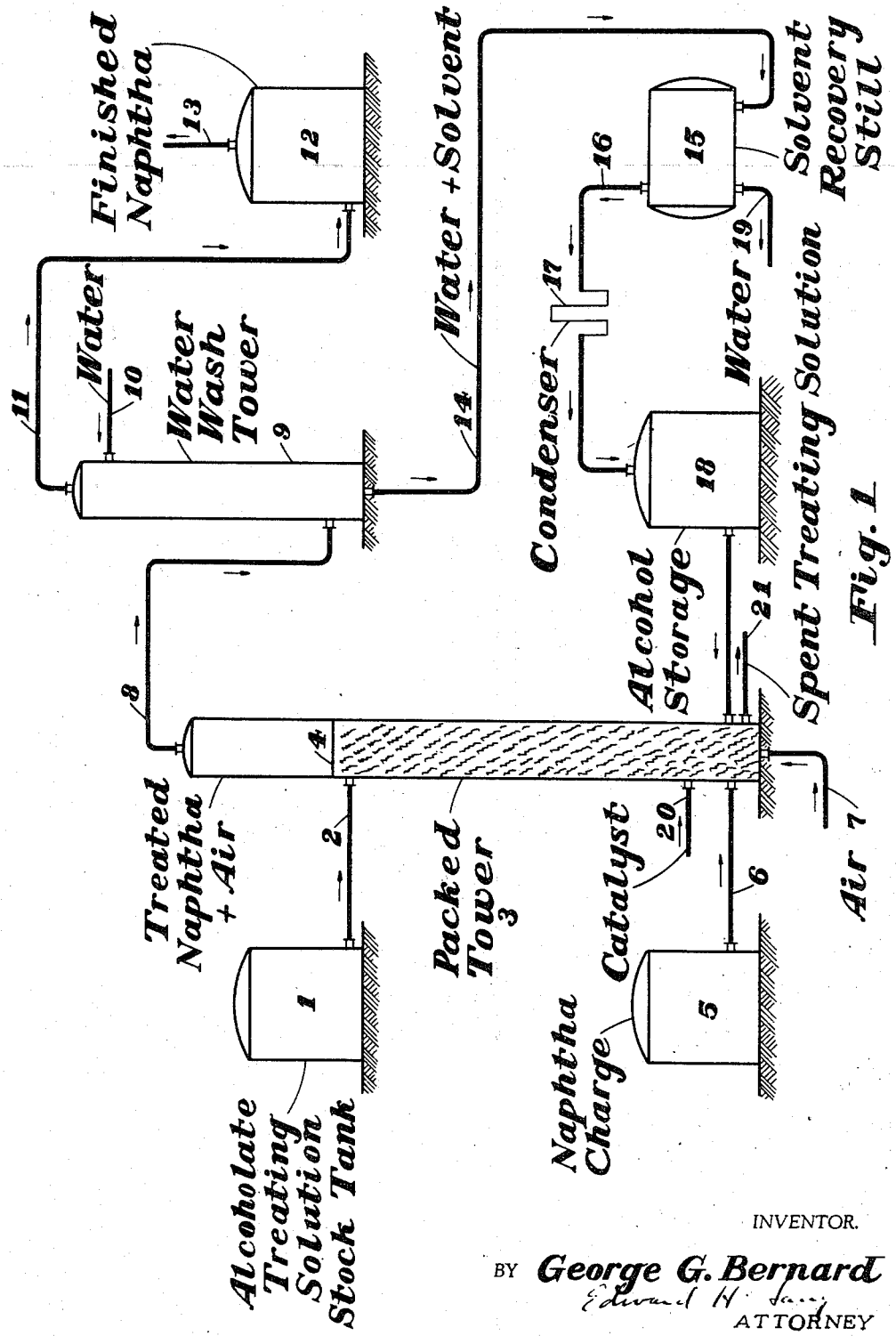

Patented Nov. 15, 1949

2,488,000

UNITED STATES PATENT OFFICE 2,488,000

METHOD OF OXIDIZING ACIDIC SULFUR COMPOUNDS

George G. Bernard, Chicago, Ill., assignor to The Pure Oil Company, Chicago, Ill., a corporation of Ohio Application October 24, 1946, Serial No. 705,335

9 Claims. (Cl. 196—29)

This invention relates to a method of removing acidic or malodorous sulfur compounds from hydrocarbon fluids such as low boiling naphthas, kerosene, gasoline and similar solvent materials, and relates particularly to a method for converting such sulfur compounds in the hydrocarbon liquid to sulfur compounds of unobjectionable odor.

It is an object of the invention to provide a simple and convenient method of sweetening hydrocarbon liquids of about gasoline boiling range, which method can be practiced in a batch or continuous flow process.

It is another object of the invention to provide a catalytic process for the air oxidation of mercaptans occurring in low boiling hydrocarbons in which substantially no water is used in the oxidation step.

Other objects and advantages of the invention will in part be obvious, and will in part appear hereinafter.

I have discovered that hydrocarbon liquids can be sweetened by air oxidation in the presence of alcoholic solutions of alkali metal alcoholates containing certain catalytic materials such that the process can be carried out in extremely convenient fashion. For example, I have found that solutions of sodium or potassium or an alkali metal in an excess of an alcohol, thereby giving a solution of the alkali metal alcoholate in the corresponding alcohol, are extremely effective agents for the conversion of acidic sulfur compounds in the hydrocarbons to innocuous materials when there is present in the alkali metal solution a small amount of a phenolic oxidation catalyst such as a polyhydroxy aromatic compound oxidizable to a quinone form. Such catalysts should be soluble in effective amounts in the alcoholic solution, and the class of effective compounds includes pyrogallol, hydroquinone, normal butyro pyrogallol, anthragallol, gallic acid, tannic acid, 3,4-dihydroxy diphenyl, 2,5-dihydroxy diphenyl, butyl pyrogallol, and monomethyl ether of pyrogallol. Other materials containing these and related phenolic compounds are also useful as catalysts and are typified by the tannins and hard wood tars. As examples of hard wood tars which are particularly effective are U. O. P. Inhibitor No. 1 and I Tar Oil. U. O. P. Inhibitor No. 1 is the commercial designation of a hard wood tar boiling between about 240° and 300° C. and sold by the Universal Oil Products Company as a gasoline antioxidant. I Tar Oil is a settled hard wood tar sold by the Tennessee Products Company. For the method for producing the settled tars, reference should be had to the article entitled "New products from wood carbonization" by A. W. Goos and A. A. Reiter of the Cliffs Dow Chemical Company, Marquette, Michigan which appeared in the February, 1946 issue of The Journal of Industrial and Engineering Chemistry, pages 132 to 135, inclusive. The several catalytic materials mentioned are effective when present in the alcoholic alkali metal alcoholate solution in amounts of approximately 0.1 to 3 per cent by weight, although I prefer to use an amount equivalent to about 1 to 2 per cent by weight.

In accordance with this invention the alcoholic alkali metal alcoholate treating solution may be a solution of an alkali metal in an excess of alcohol to which is also added about 1 to 3 per cent of the catalytic material. Water which has a tendency to gather in solutions of anhydrous alcohols is not harmful if it gathers in the solution in relatively small amounts. In fact, a certain advantage can accrue from the presence of relatively small percentages of water in the solution, because water in small amount will reduce the solubility of the alcohol in the hydrocarbon, thereby facilitating separation of the treating solution from the desulfurized hydrocarbon. However, the accumulation of a substantial quantity of water in the solution has the effect of reducing the rate of the desulfurization reaction considerably, and accordingly it is preferable to keep conditions essentially anhydrous.

The amount of alkali metal in the treating solution should be adjusted so that for each mol of alkali metal alcoholate formed there will be an excess of 4 or more mols of alcohol. In general, we prefer to use a ratio of about 5 mols of the alkali metal to 25 mols of the alcohol in preparing the alcoholate solution, although larger excesses of alcohol, approaching 100 mols of alcohol per mol of alcoholate, can be used.

The oxidation of the sulfur compounds contained in the hydrocarbon fluid will proceed most rapidly at elevated temperatures, but inasmuch as the elevation of treating temperature introduces complications involving the recovery of hydrocarbon vapors and vapors of the alcohol solvent for the treating solution, it is best to avoid excessive elevation of reaction temperature. It will be found that temperatures maintained at about ambient atmospheric temperature are most satisfactory from the standpoint of reaction rate obtainable, amount of alcohol lost by vaporization, and the avoidance of undesirable oxidation in the alcohol and hydrocarbon.

Figure 2:
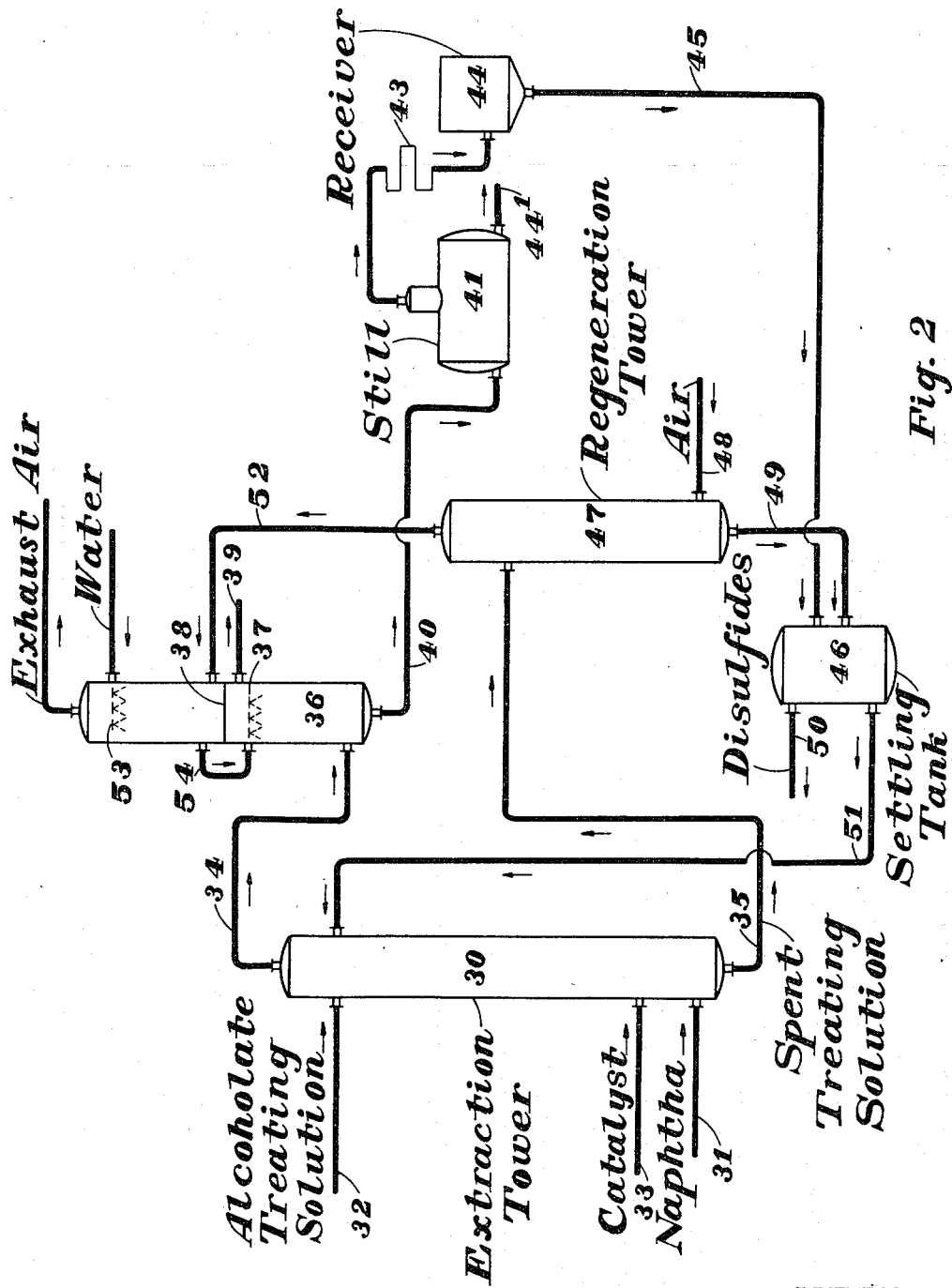

In the accompanying drawing,

Figure 1 sets forth a flow diagram which illustrates an apparatus and method for sweetening hydrocarbons in accordance with the process of my invention;

Figure 2 likewise sets forth a flow diagram of an apparatus to illustrate the method for removing acidic sulfur compounds from hydrocarbons according to the process of my invention.

Referring particularly to Figure 1, storage tank 1 holding alcoholate solution containing approximately 1 to 2 per cent by weight of a phenolic oxidation catalyst such as U. O. P. Inhibitor No. 1 or I Tar Oil feeds sufficient solution through line 2 into packed tower 3 to fill the tower to the level indicated by line 4. Naphtha from tank 5 is passed through line 6 into the bottom of tower 3 and air is bubbled into the bottom of the tower 3 through line 7. The mercaptans in the naphtha are oxidized to disulfides by the air in the presence of the alcoholate solution containing the catalyst. The sweetened naphtha containing disulfides and the spent air pass over from the top of the tower 3 through line 8 to the lower portion of wash tower 9. Water is admitted to the top of the wash tower through line 10 in order to wash dissolved and entrained treating agent from the naphtha. About 1 to 5 per cent by volume of water based on the naphtha is sufficient to remove the treating agent contained in solution in the naphtha. The washed naphtha and spent air pass from the top of the tower 9 through line 11 into finished naphtha tank 12 from which spent air escapes through line 13. The escaping air may be further washed with an absorbent such as gas oil or kerosene, if necessary, to remove any hydrocarbon vapors which may be contained therein.

Wash-water leaving the bottom of wash tower 9 through line 14 can be brought to a solvent recovery still 15.

Alcohol is taken overhead from the still 15 through line 16, condensed in condenser 17, and stored in tank 18. Water leaves the bottom of still 15 through line 19 and can be used as wash-water for charging through line 10. Alcohol from tank 18 is recycled to make more treating solution.

Make-up alkaline solvent solution may be added to the tower 3 from time to time through line 2. Catalyst may be added to the tower as found necessary through line 20. A withdrawal line 21 is provided at the bottom of the tower 3 in order to permit periodic removal of treating solution as it becomes spent.

The amount of air fed to the tower 3 through line 7 is regulated so as to supply sufficient air to sweeten the naphtha, but care should be exercised not to bubble air through the tower at such rate or in such amount as to entrain excessive quantities of treating solution and hydrocarbon vapors.

Referring now to Figure 2, numeral 30 indicates a packed tower into the bottom of which line 31 feeds naphtha or other hydrocarbon fluid to be treated and to the top of which line 32 feeds alcoholate treating solution. Line 33, is provided adjacent to the bottom of the tower to furnish catalyst as required. Sweetened naphtha leaves the top of the tower through line 34 and spent alkaline sweetening solution leaves the bottom of the tower through line 35. The naphtha passes from line 34 to the bottom of tower 36 where it is washed with a stream of water which enters the upper portion of the lower section of the tower through the spray head 37. The tower 36 is divided into two sections by the imperforate plate 38.

Washed naphtha leaves the upper portion of the lower section of tower 36 through line 39 and passes to storage. The wash-water, containing a small amount of solvent washed from the naphtha, leaves the bottom of tower 36 through line 40 and passes to solvent recovery still 41.

Alcohol vapors leave the top of still 41, pass through condenser 43 and then to receiver 44. Water is withdrawn from the bottom of the still through line 44'. From the receiver 44 alcohol is returned through line 45 to settling tank 46.

The spent alkaline treating solution leaving the extraction tower 30 through line 35 passes to the upper portion of a packed regeneration tower 47. Air is bubbled into the lower portion of the tower 47 through line 48. The mixture of regenerated solution and disulfides leaves the bottom of tower 47 through line 49 and passes to the settling tank 46 in order to permit the disulfides to settle from the solution. The disulfides are withdrawn from the top of settling tank 46, through line 50. The regenerated solution together with the solvent returned from receiver 44 is recycled through line 51 to the upper portion of extraction tower 30.

Spent air leaves the top of the regenerating tower 47 through line 52 and passes to the lower portion of the upper section of the water-wash tower 36. Water is sprayed into the upper portion of the upper section of wash-tower 36 through spray-head 53. In this washing operation hydrocarbon vapors and solvent contained in the spent air are washed therefrom. The wash-water from the upper section of tower 36 passes through line 54 to the spray-head 37 in the lower section of the tower. Where the hydrocarbon undergoing treatment is a relatively high-boiling material, such as naphtha or kerosene, the washing of the spent air in the upper section of tower 36 may be omitted. Instead of water, a hydrocarbon absorbent such as gas oil or kerosene may be used to wash the air in the upper section of the tower. In that case the absorbent will be withdrawn through a line (not shown) in the bottom of the upper section of the tower and water fed into the upper portion of the lower section. The water leaving still 41 through line 44[1] may be used as wash water in either or both sections of tower 36.

The volume ratio of treating solution to hydrocarbon fluid treated may vary from about 1 to 20 to about 1 to 2. With an efficient contact tower a volume of treating solution equal to about 5 to 10 per cent by volume of the hydrocarbon fluid is sufficient to remove substantially all acidic sulfur compounds from the fluid.

The apparatus and method thus far described have dealt specifically with continuous flow processes. It is understood that in such a case the several rates of flow of hydrocarbon and treating solution will be adjusted to give the desired or needed time of contact in the treating tower. The practice of the process in batchwise operation involves merely contacting the hydrocarbon and the alkaline treating solution for the required time in a mixing tank, allowing the phases to separate, and decanting the sweetened hydrocarbon.

The effectiveness of this process for sweetening hydrocarbon fluids by using an alcoholic solution of an alkali metal alcoholate for the treating solution and the economy of the method as shown by the rate of reaction and general efficacy of the solution are demonstrated by the results and data summarized below:

Example I

A sodium methoxide-methyl alcohol solution was prepared by dissolving 5 mols of metallic sodium in 1 liter of methyl alcohol. This resulted in a solution containing 5 mols of sodium methoxide in 20 mols of excess methyl alcohol, and to this solution 15 grams of settled hard wood tar for an oxidation catalyst was added. Fifteen volumes of sour gasoline containing 0.01 per cent of mercaptan was treated with 1 volume of the catalyst sodium methoxide solution by contacting the gasoline with the solution for 15 minutes in the presence of air. Subsequent to treatment the gasoline was tested and found to be "doctor sweet."

A parallel test was conducted by treating 10 volumes of the same sour gasoline with 1 volume of an alcoholic 15 per cent solution of sodium hydroxide having a ratio of 4 parts alcohol to 1 of water, containing 2 per cent of the same catalyst, and it was found that after completion of 15 minutes of contact the gasoline remained sour.

Example II

A treating solution was made up by dissolving 2 mols of metallic sodium in 1 liter of methyl alcohol, which procedure resulted in the production of a treating solution containing 2 mols of sodium methoxide in an excess of about 23 mols of methyl alcohol. To the solution there was added 10 grams of pyrogallol, thereby making a solution containing about 1 per cent of the catalyst. Twenty volumes of a sour naphtha having a boiling range of 250° to 300° C. was contacted for 15 minutes in the presence of air with 1 volume of the treating solution thus made up and, after separation of the naphtha, tests indicated that it was "doctor sweet." A similar test conducted with 10 volumes of the same naphtha and 1 volume of an alcoholic 15 per cent aqueous sodium hydroxide solution in which water and alcohol were present in the ratio of 1 to 4, containing 1 per cent of pyrogallol as the catalyst, failed to sweeten the naphtha.

Example III

A treating solution was made up by dissolving 3 mols of metallic sodium in 1 liter of methyl alcohol, thereby making a solution of 3 mols of sodium methoxide in an excess of more than 20 mols of methyl alcohol. Ten grams of U. O. P. Inhibitor No. 1 was added to the treating solution as a catalyst.

Ten volumes of sour Stoddard solvent was contacted with 1 volume of the treating solution thus prepared for a period of 10 minutes in the presence of air. After separation of the hydrocarbon from the treating solution it was found that the Stoddard solvent was "doctor sweet."

Similar tests were conducted on various samples of gasolines, naphthas and kerosenes having boiling ranges from about 100° to 350° C. in which the hydrocarbons were treated for periods ranging from 5 to 25 and 30 minutes with catalytic desulfurizing solutions made up according to the procedures outlined, which solutions all contained a ratio of about 1 mol of the alkali metal alcoholate to 5 to 25 or more mols of alcohol, and from 1 to 3 per cent of the catalytic materials named. In all cases in which the volume of hydrocarbon was 2 to 25 times the volume of the treating solution used, complete sweetening of the hydrocarbon resulted from the treatment. In a great many parallel tests conducted with aqueous alcoholic alkali solutions containing the same catalytic materials the sweetening did not result, or took place only to a limited extent.

The excess of alcohol can be permitted to go as high as about 100 mols of alcohol per mol of alcoholate as the following examples will indicate:

Example IV

One part by volume of a sodium methoxide solution containing about 10 mols of methyl alcohol per mol of sodium methoxide and 1 per cent of U. O. P. Inhibitor No. 1 was used to contact 10 volumes of Stoddard solvent containing 0.011 per cent of mercaptan sulfur. After 15 minutes of treatment in the presence of air, test indicated that the hydrocarbon was "doctor sweet."

In similar fashion 1 volume of a sodium methoxide solution containing 25 mols of methyl alcohol per mol of sodium methoxide and 1 per cent of hydroquinone as an oxidation catalyst was used to contact 10 volumes of Stoddard solvent containing 0.011 per cent of mercaptan sulfur. Fifteen minutes of treatment in air sufficed to render the hydrocarbon "doctor sweet."

One volume of a third solution containing 100 mols of methyl alcohol per mol of sodium methoxide and 1 per cent of pyrogallol as a catalyst was used to contact 10 volumes of Stoddard solvent containing 0.011 per cent of mercaptan sulfur. Fifteen minutes of the treatment with air agitation sufficed to render the hydrocarbon "doctor sweet."

Regeneration of the alcoholic alkali metal alcoholate solution can be accomplished very readily by heating the solution to a moderate temperature of about 50° to 75° C. and blowing it with air. As an example of the regenerative ability of the solution the following test is cited:

To a solution containing 1 mol of sodium methoxide and 15 mols of methyl alcohol, there was added sufficient butyl mercaptan to bring the concentration of mercaptan sulfur to 0.99 per cent. Half of the solution was used as a blank and to the other half 2 per cent of wood tar was added. Both samples were agitated with air for a period of an hour and then analyzed for their disulfide content. The blank was found to contain 0.17 per cent disulfide sulfur and the sample containing wood tar contained 0.53 per cent disulfide sulfur. It is apparent from these data that the methoxide solution can be readily regenerated by air oxidation.

By carrying out the sweetening operation with air or other oxygen-containing gas in the presence of alkaline treating solution containing a small amount of phenolic oxidation catalyst, sweetening of hydrocarbon liquids can be rapidly and effectively accomplished. Regeneration of alcoholic alkali metal alcoholate solutions can also be rapidly and effectively carried out by means of air or other oxygen-containing gas if the regeneration is conducted in the presence of a small amount of a phenolic catalyst dissolved in the solution.

What is claimed is:

1. The method of oxidizing mercaptans occurring with petroleum hydrocarbons comprising, contacting the hydrocarbon containing the mercaptans with a gas containing free oxygen in the presence of an alcoholic solution of an alkali metal alcoholate containing a small proportion of a phenolic material capable of forming a quinone.

2. The method in accordance with claim 1 in which the solution is a solution of an alkali metal in methyl alcohol.

3. The method in accordance with claim 1 in which the solution is a solution of sodium in methyl alcohol.

4. The method of oxidizing mercaptans in liquid hydrocarbons to disulfides comprising, contacting with a gas containing free oxygen a mixture of the hydrocarbon liquid and an alcoholic solution of an alkali metal alcoholate containing a small proportion of a phenolic material capable of forming a quinone.

5. The method in accordance with claim 4 in which the solution is a solution of an alkali metal alcoholate in methyl alcohol containing at least about 4 mols of methyl alcohol per mol of alcoholate.

6. The method in accordance with claim 4 in which the solution is a solution of sodium in methyl alcohol having a molar ratio of sodium methoxide to methyl alcohol of about 1 to 4 to about 1 to 100.

7. The method in accordance with claim 4 in which the solution comprises a solution of sodium in methyl alcohol having a molar ratio of sodium methoxide to methyl alcohol of about 1 to 4 to about 1 to 100 and which additionally contains about 1 to 3 per cent of settled hard wood tar as an oxidation catalyst.

8. The method in accordance with claim 4 in which the solution comprises a solution of sodium in methyl alcohol having a molar ratio of sodium methoxide to methyl alcohol of about 1 to 4 to about 1 to 100 and which additionally contains about 1 to 3 per cent of pyrogallon as an oxidation catalyst.

9. The method in accordance with claim 4 in which the solution comprises a solution of sodium in methyl alcohol having a molar ratio of sodium methoxide to methyl alcohol of about 1 to 4 to about 1 to 100 and which additionally contains about 1 to 3 per cent of pyrogallol as an oxidation catalyst.

GEORGE G. BERNARD.

REFERENCES CITED

The following references are of record in the file of this patent:

UNITED STATES PATENTS

| Number | Name | Date |
|---|---|---|
| 2,015,038 | Pevere | Sept. 17, 1935 |
| 2,160,632 | Yabroff et al. | May 30, 1939 |
| 2,181,036 | Wilson | Nov. 21, 1939 |
| 2,181,037 | Wilson | Nov. 21, 1939 |
| 2,183,801 | Yabroff | Dec. 19, 1939 |
| 2,212,107 | Yabroff | Aug. 20, 1940 |
| 2,312,820 | Henderson | Mar. 2, 1943 |
| 2,369,771 | Bond | Feb. 20, 1945 |

---

Certificate of Correction

Patent No. 2,488,000 November 15, 1949

GEORGE G. BERNARD

It is hereby certified that error appears in the printed specification of the above numbered patent requiring correction as follows:

Column 8, line 8, for "pyrogallon" read *pyrogallol*;

and that the said Letters Patent should be read with this correction therein that the same may conform to the record of the case in the Patent Office.

Signed and sealed this 7th day of March, A. D. 1950.

[SEAL]

THOMAS F. MURPHY,
*Assistant Commissioner of Patents.*

Certificate of Correction

Patent No. 2,488,000 November 15, 1949

GEORGE G. BERNARD

It is hereby certified that error appears in the printed specification of the above numbered patent requiring correction as follows:

Column 8, line 8, for "pyrogallon" read *pyrogallol*;

and that the said Letters Patent should be read with this correction therein that the same may conform to the record of the case in the Patent Office.

Signed and sealed this 7th day of March, A. D. 1950.

[SEAL]

THOMAS F. MURPHY,
*Assistant Commissioner of Patents.*